United States Patent [19]
Middlebrook

[11] 3,875,495
[45] Apr. 1, 1975

[54] DYNAMO-ELECTRIC ROTARY TRANSFORMER

[75] Inventor: Robert D. Middlebrook, Pasadena, Calif.

[73] Assignee: Electric Motion Control Corporation International, Pasadena, Calif.

[22] Filed: May 7, 1973

[21] Appl. No.: 357,836

[52] U.S. Cl............ 321/28, 310/129, 310/230, 321/29, 323/14
[51] Int. Cl. ............................................. H02m 3/40
[58] Field of Search ...... 310/129, 230, 241; 321/28, 321/29; 323/10, 14

[56] References Cited
UNITED STATES PATENTS

| | | | |
|---|---|---|---|
| 940,492 | 11/1909 | Arnold et al............... | 310/241 X |
| 1,248,474 | 12/1917 | Fynn........................ | 310/230 X |
| 1,305,011 | 5/1919 | Ruedenberg............... | 310/241 X |
| 1,376,020 | 4/1921 | Korthals-Altes............ | 310/241 X |
| 1,590,030 | 6/1926 | Hull......................... | 310/241 X |
| 2,444,769 | 7/1948 | Fisher....................... | 323/10 X |
| 2,596,431 | 5/1952 | Pestarini................... | 323/13 |
| 3,480,813 | 11/1969 | Sillano..................... | 310/241 |
| 3,557,325 | 1/1971 | Hansen..................... | 310/230 X |

Primary Examiner—R. N. Envall, Jr.

[57] ABSTRACT

The properties of a rotary DC-to-DC transformer, such as may be used for control of traction motors and the like, comprising a dynamo-electric machine with movable secondary brushes, are significantly improved by providing two sets of counter-rotating secondary brushes which are maintained in symmetrical angular relation to the primary brush set and which share the secondary current. That structure reduces both the maximum energy loss due to armature resistance and the maximum armature reaction mmf to one quarter of their conventional values. Such improved rotary transformers become a practicable means for obtaining smooth motor control and automatic regenerative braking. Circuitry is described for correcting or compensating the armature reaction in such machines, including compensation of the reaction component due to torque current in a rotary transformer having its rotor and a controlled direct current motor differentially coupled to an output shaft. With dual output, the invention provides combined speed and steering control for vehicles.

17 Claims, 8 Drawing Figures 3,875,495
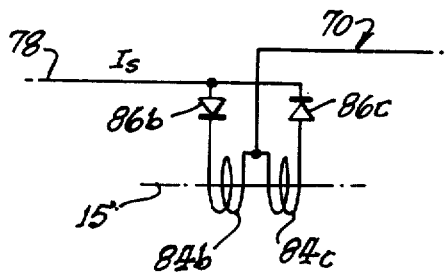
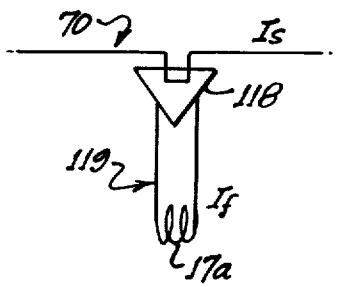
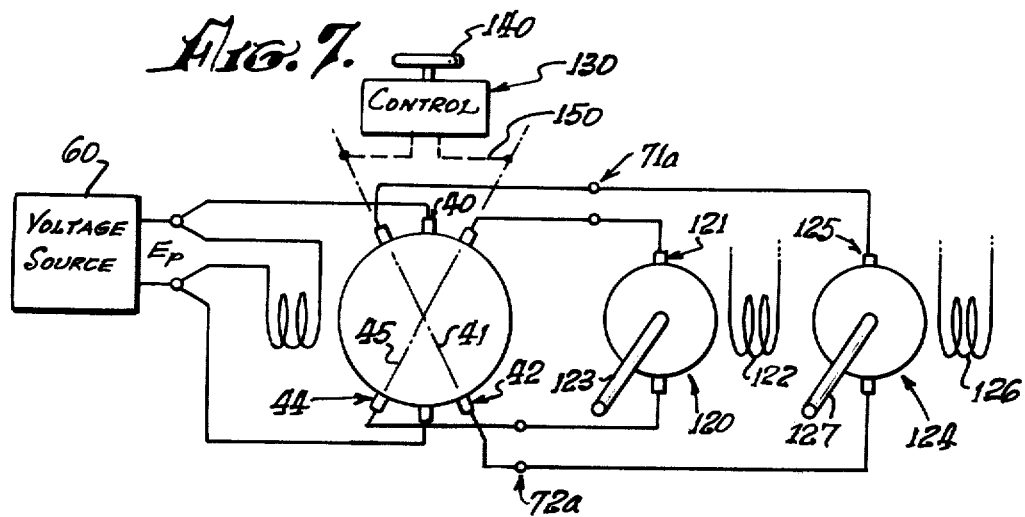
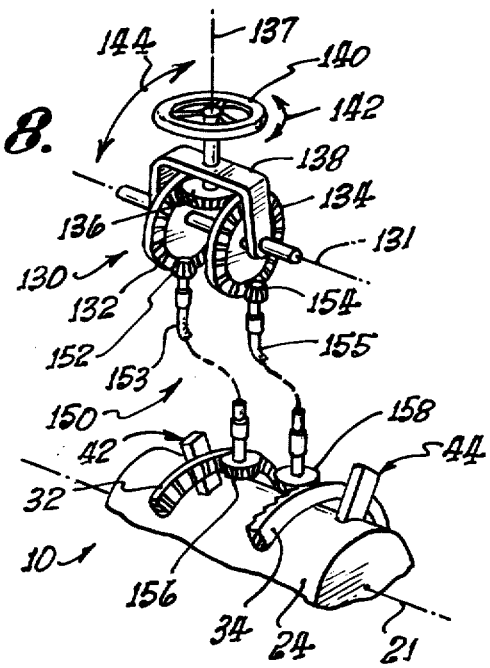

DYNAMO-ELECTRIC ROTARY TRANSFORMER

BACKGROUND OF THE INVENTION

This invention has to do generally with rotary dynamo-electric machines for transforming direct current electrical power with respect to its voltage. The output from such a rotary transformer may be supplied to any desired power utilization device, but is particularly suitable for controlling the speed of a direct current motor.

A conventional direct current dynamo-electric machine, which is usable as a motor or as a generator, comprises an armature rotatable between the poles of an associated separately excited magnetic field structure. The armature carries a winding that is connected to a commutator, and external electrical connections are made to the winding via a set of brushes which contact the commutator. With the brush set connected to a supply of direct current voltage, the armature rotates at a speed determined by the supply voltage and by the magnetic flux strength in the field structure. With neglect of resistive and magnetic losses no current is drawn from the supply unless the armature is subjected to a mechanical torque. The armature current then corresponds in magnitude and direction to that torque. During operation as a motor the direction of that torque current corresponds to the supply voltage and draws power from the supply. If the armature is mechanically driven, either by temporary action of an "overhauling load," or for regular operation of the machine as a generator, the armature current is reversed and delivers power to the "source." Whether acting as motor or generator, the machine may be considered as a transducer, converting power between electrical and mechanical forms.

Such a conventional DC dynamo-electric machine can be fitted with an additional brush set, and may then be used as a DC-to-DC transformer. With the primary brush set connected to a source of constant voltage $E_p$, a secondary voltage $E_s$ appears across the secondary brush set. That secondary voltage depends upon the angular position $\phi$ of the secondary brush axis relative to the primary brush axis. With neglect of losses, such a rotary DC-to-DC transformer draws zero current from the voltage supply if no current is drawn from the secondary circuit. However, if a current $I_s$ flows between the secondary brushes, a reflected current $I_r$ flows between the primary brushes, the current transform ratio being the reciprocal of the voltage transform ratio. The machine thus acts as a variable transformer of both voltage and current, with transform ratios adjustable by variation of the angular position of the secondary brush axis.

The described capability of a dynamo-electric machine to operate as a rotary DC-to-DC transformer has been known at least since 1913, when U.S. Pat. No. 1,052,717 was issued to E. M. Fraser. However, such systems do not appear to have been developed commercially to any appreciable extent during the six decades since the Fraser patent issued. That lack of attention is believed due in large part to two disadvantages which have been considered to be inherent in the mechanism.

One of those disadvantages is the power loss due to resistance in the armature winding. That power loss varies from zero when primary and secondary brush sets are aligned, to a maximum value when the two brush sets are separated by 90 electrical degrees. Under the latter condition the resistive power loss has the same form as for an electric motor. Hence, if the rotary transformer is employed to control a motor, for example, and must be capable of handling the maximum rated current of the motor at any secondary voltage setting, the transformer must be rated to sustain the same maximum power loss as the motor. In other words, the controlling machine must be physically as large as the machine to be controlled, even though no direct mechanical output from its armature is utilized.

The second disadvantage which has held up development of rotary transformers has been the impossibility of accurately compensating the armature reaction. In any dynamo-electric machine the armature current produces a magnetomotive force (mmf) whose principal direction is parallel to the axis of the brush set carrying the current. The armature reaction mmf typically subtracts from the mmf of the field winding over part of each pole face, and adds to it over the remainder of each pole face. Assuming that the main field winding mmf is just sufficient to produce an essentially saturated magnetic field, the effect of the armature mmf is to reduce the magnetic flux density of the field where subtraction occurs; but where addition occurs the magnetic flux density is not significantly increased because it is already substantially at its saturation value. Consequently, the armature reaction mmf causes both distortion and net reduction of the magnetic flux, thereby degrading the performance of the machine.

In a conventional motor or generator having only one set of fixed brushes, the effect of the armature reaction mmf can be corrected in known manner by means of auxiliary field windings of various types, through which part or all of the armature current is caused to flow. In particular, the so-called "compensating winding" is mounted with its axis parallel to the axis of the brush set, so that its mmf directly opposes, and may accurately compensate, the armature mmf. The less expensive "over-excitation winding" has its axis parallel to the main field winding, serving to increase the general field mmf sufficiently to overcome the subtractive effect of the armature mmf.

In a rotary transformer of the type here described, the armature reaction mmf comprises two components, one due to the secondary current and parallel to the axis of the secondary brush set, and the other due to the reflected current and parallel to the axis of the primary brush set. The effect of the latter component can be corrected by passing the reflected current through a conventional compensating winding. However, since the secondary current mmf varies in both magnitude and direction as the secondary brush set is rotated, its effect cannot be corrected by a fixed compensating winding. An over-excitation winding can be designed to correct the maximum subtractive effect of the secondary current, so long as the latter does not reverse direction, but at the cost of appreciable power loss.

SUMMARY OF THE INVENTION

The present invention virtually solves the two problems outlined above, by reducing to about one fourth of their previous values both the maximum armature power loss and the maximum armature reaction due to secondary current in a dynamo-electric machine acting as a DC-to-DC transformer and designed to transform a given amount of current at all settings of the output voltage.

That is accomplished by replacing the single movable secondary brush set of previous rotary transformers by a pair of secondary brush sets which are both rotatably mounted and are coupled together in such a way that the axes of the secondary brush sets form equal angles with the fixed axis of the primary brush set, but in opposite directions. The two secondary brush sets are electrically connected in the output circuit or circuits so that they carry substantially equal shares of the total output current. That arrangement will be described for convenience as two counter-rotating secondary brush sets. When the rotary transformer is employed for controlling a single electrical load, the two secondary brush sets are preferably connected directly in parallel, the brushes of each set being connected to the respective brushes of the other set that are at positions of equal voltage on the commutator. The secondary current is then shared equally between the two brush sets, due to symmetry of the structure, yielding maximum electrical and magnetic advantages.

With the counter-rotating secondary brush sets of the invention, the overall transform ratios for voltage and current remain the same as in the prior art machines having a single secondary brush set, so that the overall DC-to-DC transformer properties remain unaltered. However, because of the split of the secondary current between two brush sets which are symmetrically disposed with respect to the fixed primary brush set, the pattern of current flow within the armature and the nature of the resulting magnetomotive force are radically altered.

As will be described more fully below, the invention permits significant reduction of the total power loss due to both secondary and reflected armature current throughout the range of brush adjustment. Moreover, the maximum value of that power loss, which typically determines the size of the machine, is reduced to only one quarter of the previous maximum value. Hence, the invention typically permits a rotary transformer to control a motor having approximately twice its power rating.

The maximum value of the total armature reaction mmf is also reduced by 75% as compared to a comparable machine with only one set of secondary brushes. The effects of the small remaining armature reaction can often be simply neglected, or can be corrected by a relatively small over-excitation winding.

A further aspect of the invention permits over-excitation or compensation windings to serve a useful function in addition to correction of armature reaction. When the two secondary brush sets are connected directly in parallel there is a tendency for slight unsymmetries of the magnetic field or other properties of the system to produce circulating currents in the loop circuit formed by those brush sets. Since the impedance in such loop circuits tends to be small, such circulating currents may become quite large, degrading the desired symmetry of the armature currents. The invention provides circuitry by which the auxiliary windings for correcting armature reaction are included in the loop circuit. The impedance of such auxiliary windings then reduces the circulating currents sufficiently to maintain the desired symmetry.

All of the above described improvements in a dynamo-electric DC-to-DC transformer have utility regardless of the type of system in which the transformer is employed. However, in certain systems those improvements afford further advantages which significantly increase the overall utility of the system.

For example, a rotary transformer may be employed not only to deliver electrical power at controllably variable voltage, typically for controlling a motor, but also to deliver mechanical power directly from its rotor. That is, a rotary transformer may perform simultaneously not only the function of transformer but also the function of transducer, transducing power between electrical and mechanical form. More particularly, the power output shaft of such a system may be coupled through differential gearing both to the transformer rotor and to the rotor of a second dynamo-electric machine which receives voltage from the rotary transformer. Systems of the latter type are described and claimed in U.S. Pat. No. 3,697,763, issued on Oct. 10, 1972 to the present applicant. As is explained more fully in that patent, the second dynamo-electric machine typically acts sometimes as a motor and sometimes as a generator, but may be referred to as a "motor" for clarity of description.

In accordance with a further aspect of the present invention, it has been discovered that the component of the armature reaction mmf due to mechanical power taken from the transformer rotor can be effectively compensated in such differentially coupled systems. That is accomplished by utilizing the fixed relationship that exists in such systems between the torque produced by the motor and the torque produced by the rotary transformer in its capacity as a transducer. Because of that relationship, the proper current for supply either to a compensating winding or to an over-excitation winding of the transformer-transducer for correction of the described reaction component can be derived from the secondary current alone. Full compensation of the armature reaction mmf of the controlled motor can also be derived from that same secondary current.

Many advantages of the present invention are obtainable without precisely equal division of secondary current between the two counter-rotating brush sets of the rotary transformer. Whereas in the generally preferred form of the invention the two secondary brush sets are connected in parallel in a single output circuit, they may alternatively be connected in respective separate output circuits in which distinct secondary currents flow which are similar in magnitude but not always strictly equal. In such systems the advantages that have been described are fully attained whenever the two secondary currents are equal, and are partially attained under other conditions.

BRIEF DESCRIPTION OF THE DRAWING

A full understanding of the invention, and of its further objects and advantages, will be had from the following description of illustrative manners of carrying it out. The particulars of that description and of the accompanying drawings are intended only as illustration and not as a limitation upon the scope of the appended claims.

In the drawings:

FIG. 5 is a fragmentary drawing representing a modification;

FIG. 6 is a fragmentary drawing representing a further modification;

FIG. 7 is a schematic drawing representing an illustrative system embodying a further aspect of the invention; and FIG. 8 is a schematic perspective representing an illustrative control mechanism for use in connection with the system of FIG. 7.

DESCRIPTION OF THE PREFERRED EMBODIMENTS

Rotary Transformer with Counter-rotating Brush Sets

Figure 1:
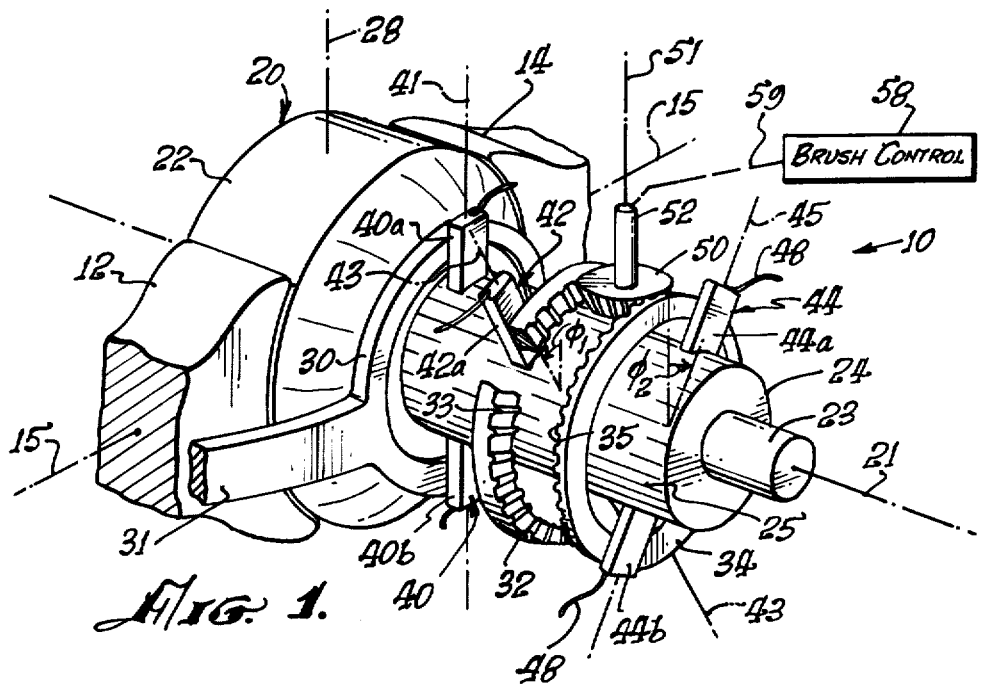
FIG. 1 is a schematic perspective representing in fragmentary form an illustrative rotary transformer structure in accordance with the invention.
Figure 2:
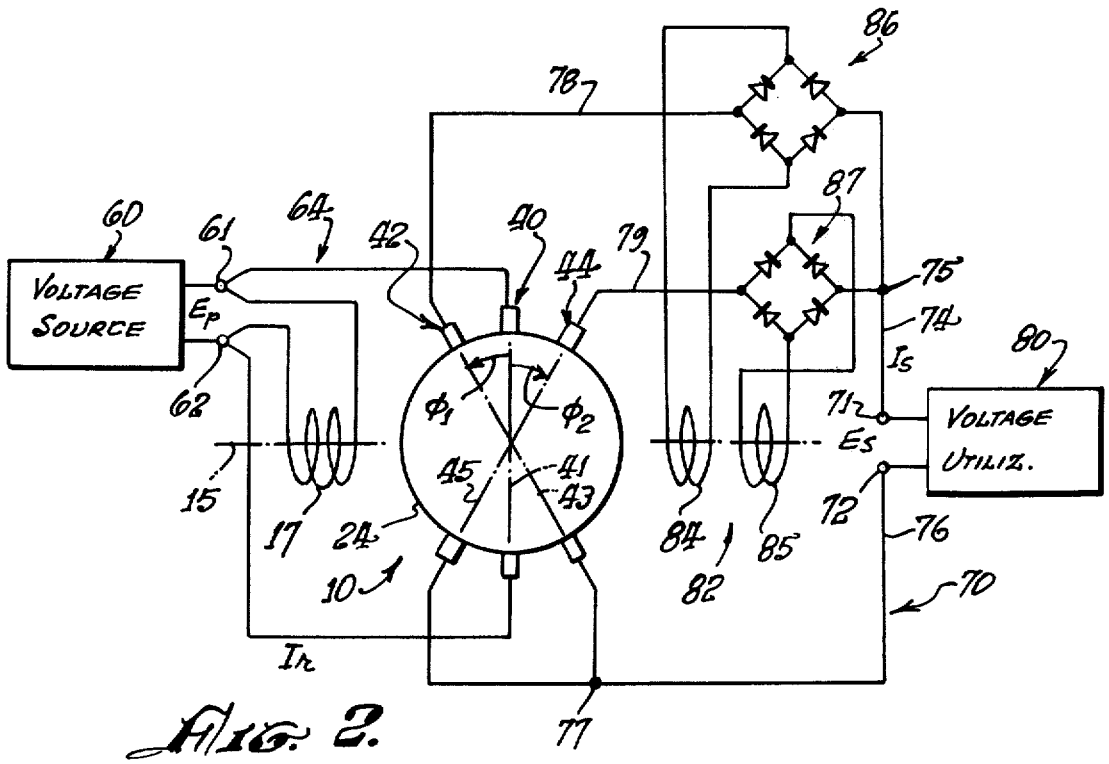
FIG. 2 is a schematic drawing representing typical electrical connections for a machine according to FIG. 1, including over-excitation winding means.

An illustrative rotary transformer 10 embodying the invention is represented in schematic and fragmentary form in FIG. 1, with electrical connections shown in FIG. 2.

For clarity of illustration the machine is shown as having only one pair of poles, extension to multipolar machines being obvious without specific illustration. The main magnetic pole structure is represented by the two magnetic poles 12 and 14, which are aligned on the pole axis 15 and carry conventional field windings, not explicitly shown, for producing magnetic flux in the stator core structure and between the pole faces. Auxiliary poles and associated winding means may be provided for performing the various conventional functions of such structures, but are omitted from the drawings for clarity of illustration. The rotor 20 is mounted on the shaft 23 and is journaled between the pole faces by suitable bearings, not shown, on the rotor axis 21, which is perpendicular to pole axis 15. Rotor 20 comprises the armature 22 and the commutator 24 with the commutator segments 25. Armature 22 includes a conventional winding, not explicitly shown, which is connected to the segments of commutator 24 and cooperates electromagnetically in the usual way with the magnetic field of the stator.

In accordance with the present invention, machine 10 has three distinct sets of brushes engaging the working surface of commutator 24. In the present two-pole machine each brush set consists of one pair of brushes positioned diametrically with respect to the commutator. The primary brush set 40, comprising the brush pair 40a, 40b, is mounted on the machine frame by means of the support ring 30 and the bracket arms 31, typically in fixed position with the primary brush axis 41 aligned with neutral axis 28 of the stator field. The two secondary brush sets 42 and 44, comprising the respective brush pairs 42a, 42b (of which brush 42b is hidden behind the commutator) and 44a, 44b, are mounted on the respective rings 32 and 34. Those rings are rotatably mounted on the machine frame, typically by large ball bearings not explicitly shown, for free rotation coaxially of shaft 23. The angular position of each of the secondary brush sets 42 and 44 with respect to rotor axis 21 is thus variable by rotation of its ring 32 or 34, causing corresponding variations in the respective angles $\phi_1$ and $\phi_2$ formed between the secondary brush axes 43 and 45 and primary brush axis 41, all such angles being measured in electrical degrees. Each brush is mounted in electrically insulated relation to its support structure by conventional means, not shown in detail, and is connected to the electrical circuit system (FIG. 2) by the flexible wires indicated at 48, or by any other suitable means, such as slip rings or the like, for accommodating circular brush movement about the periphery of the commutator. Mechanical interference between brushes of the respective sets is prevented by their axial offset, such offset being greatly exaggerated in FIG. 1 for clarity of illustration.

Drive and coupling structure of any suitable type is provided for adjustably varying the rotational positions of the brush carrying rings 32 and 34 while maintaining the angles $\phi_1$ and $\phi_2$ equal in magnitude and opposite in direction. That is, the two secondary brush sets are always shifted through equal angles in opposite directions, maintaining symmetrical angular positions with respect to the primary brush set. As illustratively shown, oppositely inclined bevel gear teeth 33 and 35 are cut in the peripheries of the respective brush supporting rings 32 and 34 and are engaged by opposite sides of the bevel pinion 50. The pinion is fixedly mounted on the shaft 52, which is journaled on the machine frame by bearing means not explicitly shown, on the pinion axis 51. That axis is radial with respect to rotor axis 21. Pinion rotation then drives the rings 32 and 34 through equal and opposite angles. Shaft 52 is driven by any suitable control means, indicated schematically at 58 with drive coupling 59. That control means may comprise, for example, an operating handle for manual control, or an electric motor with suitable gear train and control circuitry, typically including a signal source and a servo loop for producing drive movements in response to a control signal.

FIG. 2 represents illustrative electrical connections for the rotary transformer of FIG. 1. A source of direct current voltage is indicated schematically at 60, producing at the input terminals 61 and 62 the substantially constant voltage $E_p$. That voltage is supplied via the primary circuit 64 to the primary brush set 40. The main field winding is represented in FIG. 2 as the single coil 17 on one side of the rotor for clarity of illustration. That winding is excited from any suitable voltage source, shown typically as the source 60, already described, to which it is connected via the terminals 61 and 62 in parallel relation to the primary brush circuit 64. Winding 17 is ordinarily so designed that the mmf produced in the field structure in response to the applied voltage will normally cause substantial saturation of that field structure. The connections so far described then cause armature rotation at a definite normal speed, corresponding to the magnetic field intensity and the voltage $E_p$ applied to primary brush set 40.

In accordance with one aspect of the invention, the two secondary brush sets 42 and 44 are connected in parallel to the output terminals 71 and 72 via the secondary or output circuit 70, which comprises the lines 74 and 76. The secondary voltage $E_s$ produced between those output terminals is related to primary voltage $E_p$ by the equation $$E_s = nE_p \qquad (1)$$

where $$n = 1 - \phi/90°  \quad (2)$$

in which $\phi$ represents the common value of $\phi_1$ and $\phi_2$, the equal angles between the respective secondary brush axes 43 and 45 and primary brush axis 41. As $\phi$ is increased, typically by rotation of pinion 50 of FIG. 1, from zero through 90° to 180°, the secondary voltage $E_s$ varies from equality with the primary voltage $E_p$, through zero, to $-E_p$, that is, to a value equal to $E_p$ with opposite polarity. Thus, the machine acts as a DC-to-DC transformer with effective voltage "transform ratio" $n$, where $n$ varies from +1 through zero to −1. The resulting secondary or output voltage is useful for many purposes, particularly in view of its smooth inversion of polarity as its value passes through zero. A device for utilizing the output voltage $E_s$ is indicated schematically at 80 in FIG. 2.

The current $I_s$ flowing in secondary circuit 70 is divided equally between the secondary brush sets 42 and 44, due to their parallel connection. The value and also the direction of that secondary current depend upon the nature of load device 80 connected in the secondary circuit. Whatever the value and direction of that secondary current $I_s$, a "transformed" or "reflected" current $I_r$ of corresponding value and direction flows between the primary brushes. That correspondence is such that $$I_r = nI_s  \quad (3)$$

where $n$ is given by (2).

The sequence of cause-and-effect is therefore as follows: the voltage $E_s$ across the secondary terminals is determined jointly by the primary supply voltage $E_p$ and the common angle $\phi$ of the secondary brush sets, as $E_s = nE_p$; the nature of the load device determines the secondary current $I_s$ that results from the established $E_s$; and the reflected current $I_r$ is then uniquely determined as $I_r = nI_s$. Thus, at any given brush angle and corresponding secondary voltage, the magnitude and direction of the resulting secondary current is determined solely by the load. If the load is "passive," it absorbs power and the machine transmits power from the source to the load; if the load is "active," it delivers power, the directions of both the secondary and the reflected currents reverse, and the machine transmits power from the load to the source.

An example of a load that can be either passive or active is a direct-current shunt motor driving a vehicle. The vehicle speed is readily controllable in response to variation of the common angle $\phi$ of the two secondary brush sets 42 and 44. As $\phi$ varies from zero through 90° to 180° the motor speed varies continuously from full normal speed in one direction through zero to normal speed in the other direction. Power is supplied to the load motor during acceleration and normal drive; but when the vehicle speed tends to exceed the value corresponding to the secondary voltage, as during rapid deceleration, or during descent of a hill, for example, the secondary current and the reflected current both reverse direction, reversing the direction of power flow and producing dynamic braking of the vehicle. An important advantage of the present voltage control system is its capacity for handling automatically such reversals of current, by which energy is received from the load and returned to the primary voltage source.

Reduction and Correction of Armature Reaction

In accordance with a further aspect of the invention, means are provided for correcting the armature reaction due to both secondary and reflected currents in the described rotary transformer, and during both normal operation and operation with reversed direction of energy flow. As schematically shown in FIG. 2, over-excitation winding means 82 are provided, comprising the two distinct auxiliary field windings 84 and 85, which are mounted in alignment with pole axis 15. Although both those windings are shown for clarity on the opposite side of the machine from main field winding 17, they would typically be closely associated spatially with the field windings in an actual machine. Auxiliary windings 84 and 85 are excited by currents which are proportional in magnitude to the secondary current components in the respective secondary brush sets 42 and 44, but are constant in direction.

Such exciting currents are obtainable, for example, by inserting one of the identical bridge rectifier circuits 86 and 87 in series with each secondary brush set, and connecting the rectifier outputs in series with the respective auxiliary windings. Two parallel-connected circuits are thereby formed between the junction points 77 and 75, one via secondary brush set 42, the line 78, rectifier 86 and winding 84; and the other via secondary brush set 44, the line 79, rectifier 87 and winding 85. The two components of the secondary current thus pass through the respective auxiliary windings 84 and 85, but always in the same direction independently of the direction of the secondary current. That direction is so selected that the mmf produced in the field structure by each auxiliary winding is directly additive with that produced by main winding 17. The auxiliary winding pair then acts as an over-excitation winding, tending to correct the subtractive effect of the total armature reaction, and can be designed to maintain substantially full field saturation over the entire pole faces, regardless of the direction of that reaction.

A particular advantage of the present invention is the fact that the total ampere turns of the auxiliary windings 84 and 85 required for correction of the total armature reaction, due to both secondary and reflected current, is significantly less than is required in a rotary transformer of the prior art. In the latter case, with a single secondary brush set, the armature reaction due to secondary current is parallel to the axis of that brush set, varying in both value and direction as the brushes are rotated. The armature reaction due to both secondary and reflected currents is zero for $\phi = 0$ and 180° because the secondary current is then conducted through the commutator to the primary brushes without passing through the armature winding at all. As $\phi$ is shifted away from those values the total reaction increases progressively and passes through a maximum, after which the secondary current component continues to increase to a maximum at $\phi = 90°$ while the reflected current component decreases to zero with the value of that current.

In the present system each secondary brush set carries a current of $I_s/2$, and may be considered to produce its own armature reaction parallel to its brush axis. The components of those two reactions perpendicular to primary brush axis 41 are equal and opposite, and directly cancel, while the parallel components add. Thus the resultant secondary current reaction is always parallel to the axis of the primary brush set and hence to the neutral field axis. That resultant, like the reflected current armature reaction, vanishes for $\phi = 0$ and 180° for the same reason as in the prior art, but also vanishes for $\phi = 90°$ by symmetry. Hence, in the system of the invention the total armature reaction vanishes when $\phi$ is 90° as well as 0° and 180°.

Moreover, for a given value of the secondary current, the maximum value of the total armature reaction can be shown to be only one fourth of the maximum value in the prior art. Hence a desired degree of correction of the maximum total armature reaction can be attained in the present system with over-excitation windings having only one fourth the ampere turns that would be required in previously available systems. Indeed, in smaller machines the over-excitation winding can often be omitted altogether, especially since the armature reaction vanishes at three particularly significant brush angles.

The circuit of FIG. 2 can be simplified, if desired, by replacing the two auxiliary windings and rectifiers of that figure by a single auxiliary winding and rectifier, through which the entire secondary current flows. For example, auxiliary winding 85 and rectifier 87 of FIG. 2 may be omitted, and line 79 connected directly to line 78. That connection then replaces junction 75 as the point at which the two secondary current components are united. Since that union occurs between the secondary brush sets and the remaining rectifier, which will be referred to as 86a, the entire secondary current flows through that rectifier and through the remaining auxiliary winding 84a. The resulting circuit is illustrated, though in a somewhat different setting, in FIG. 4. The described circuit change typically requires doubling the wire cross section of winding 84a, but does not require any change in the number of turns in that winding, since passage of the entire secondary current through the one winding produces the same number of ampere turns as passage of half the current through each of the two windings of FIG. 2. Hence both forms of the circuit require substantially equal weights of copper.

However, the circuit of FIG. 2 has the advantage that the loop circuit from junction 77 through one secondary brush set to junction 75 and back to junction 77 via the other brush set includes the resistive load of both auxiliary windings and their associated rectifiers. Hence the circulating current in that loop caused by any slight inequality of voltage between the brushes of the respective sets is held to a moderate value, and does not produce any significant lack of symmetry between the currents actually flowing in the respective brush sets.

Reduction of Armature Power Loss

A further important advantage of the present system is the sharp reduction in power loss due to armature resistance. It can be shown that the total power loss $P$ due to secondary and reflected currents in the armature resistance $R$ of a prior art rotary transformer is given by the equation $$P = (1 - n^2)I_s^2R$$

(4)

Thus, $P$ is zero when $n$ is either $+1$ or $-1$, that is, when $\phi$ is 0° or 180°, positions at which the secondary current is conducted through the commutator to the primary brushes and does not flow through the armature winding at all. The maximum power loss occurs when $n$ is 0, that is, when $\phi$ is 90°, and is given by $$P_{max} = I_s^2R$$

(5)

It is particularly disadvantageous for certain applications to have that maximum power loss occur when the output voltage is zero. If the rotary transformer is to be used for controlling a vehicle motor, for example, the maximum output torque is often required as the vehicle is started from rest and accelerated at low speed, or is slowed with the help of dynamic braking.

With two secondary brush sets acting in parallel and sharing the secondary current in accordance with the present invention, the power loss due to both secondary and reflected currents in the armature resistance can be shown to be $$P = (|n| - n^2)I_s^2R$$

(6)

Thus, $P$ is zero not only $n$ is $+1$ and $-1$, as in the prior art, but also when $n$ is 0, that is, when $\phi$ is 90°. The power loss is zero when $n$ is 0 because the reflected current is zero by equation (3), and the secondary current does not pass through the armature, but is shorted out via the external parallel connection of the two secondary brush sets.

As may also be seen from equation (6), the maximum power loss occurs when $n$ is $+1/2$ or $-1/2$, that is, when $\phi$ is 45° or 135°, and is given by $$P_{max} = (\tfrac{1}{4})I_s^2R$$

(7)

The maximum value of the power loss is thus only one quarter that for a corresponding prior art machine. Moreover, that reduced value of the maximum power loss occurs when the output voltage has the intermediate value of $E_p/2$ from equation (1). In particular, if the machine is used to control the drive of a vehicle, for example, the secondary current power loss is zero for zero speed, at which maximum torque is typically required, and also for maximum speed, which is especially apt to be used continuously for long periods in many applications.

Figure 3:
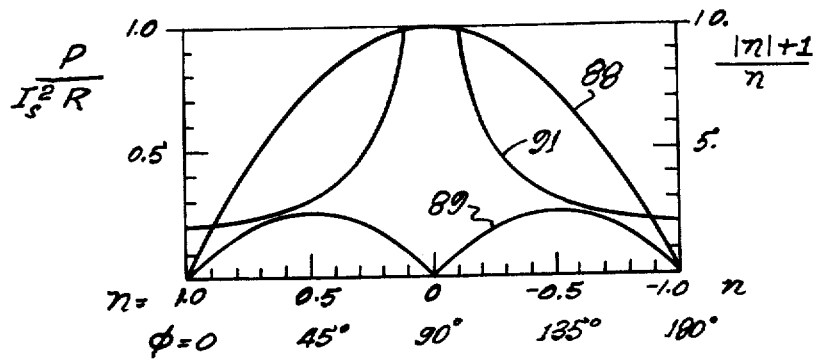
FIG. 3 is a schematic graph comparing losses due to armature resistance according to the invention and the prior art.

Those relationships will be clarified by FIG. 3, in which the curves 88 and 89 show respective values of the computed total power loss due to armature resistance for a conventional rotary transformer and for a rotary transformer in accordance with the present invention. The power loss is expressed as a fraction of $I_s^2R$, with scale at the left of the graph, and is plotted against both $n$ and $\phi$. The entire area between curves 88 and 89 represents power loss that is eliminated by the invention. The additional curve 91, with scale at the right, shows the ratio of the prior art power loss to that of the invention. That curve shows a loss reduction by a factor of two in the two regions near $n = +1$ and $-1$, with that factor increasing progressively toward infinity with decreasing $n$. The four-fold reduction of the maximum power loss, already mentioned, is seen by comparing the broad peak of prior art curve 88 at $\phi = 90°$ with the two relatively narrow peaks of curve 89 at 45° and 135°.

That four-fold reduction of the maximum power loss due to armature resistance for given secondary current $I_s$ means that the maximum allowable secondary current is doubled for a rotary transformer of given size when constructed in accordance with the invention. Consequently for a given supply voltage the allowable transformed power is also doubled. The use of counter-rotating secondary brush sets allows a machine of given size to transform twice the power that it can transduce as a motor or generator. When machine 10 of FIG. 2, for example, is employed to control a direct current shunt motor at 80, the power loss rating of machine 10 need be only one fourth that of the motor. That provides an appreciable saving over the prior art situation, in which both machines required the same power rating.

Machine Differentially Coupled to Output Shaft

Figure 4:
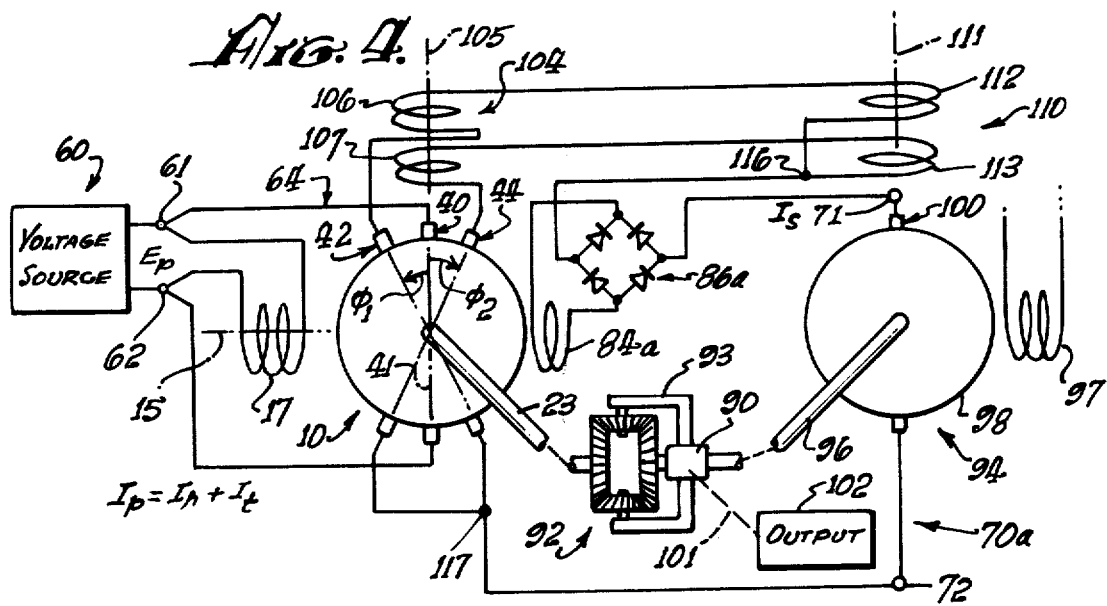
FIG. 4 is a schematic drawing representing an illustrative system according to the invention, wherein a dynamo-electric machine is employed as both transformer and transducer.

FIG. 4 illustrates schematically a further aspect of the invention, having to do with a system in which an output shaft 90 is coupled via the differential gearing 92 to the rotor shaft 23 of a rotary transformer 10 and to the shaft 96 of a dynamo-electric machine 94 which receives a variable voltage from the transformer via the secondary circuit 70a. The general structure of rotary transformer 10 may be as already described in connection with FIG. 1, with voltage supply from source 60 via terminals 61 and 62, and requires no further description. Machine 94 has the commutator 98 and the conventional brush set 100, which is connected at terminals 71 and 72 in series in secondary circuit 70a of transformer 10. Machine 94 thus takes the place of voltage utilization device 80 of FIG. 2. The armature and field structure of machine 94 are typically of conventional construction, and are omitted from FIG. 4 for clarity of illustration. The main field winding of machine 94 is indicated at 97, and is connected via wires not explicitly shown to any suitable source of constant voltage, such as the source 60, already described, for example.

Differential gearing 92 typically comprises bevel gears fixedly mounted on the respective shafts 23 and 96 and engaged by pinions which are freely journaled on stub shafts on the spider 93. Output shaft 90 comprises a sleeve rotating freely on shaft 96 and fixedly carrying the spider. Output shaft 90 is coupled by means indicated schematically at 101 to any desired output device 102. With transformer shaft 23 operating at constant speed, the speed of output shaft 90 is then determined uniquely by the speed and direction of rotation of armature shaft 96 of machine 94.

In preferred form of the system of FIG. 4, gearing 92 is made symmetrical with respect to shafts 23 and 96, and those shafts are arranged to have equal and opposite normal speeds when the two secondary brush sets of transformer 10 are at angle $\phi = 0$, producing zero rotation of output shaft 90. As $\phi$ is increased from zero, the speed of shaft 96 is reduced, progressively accelerating output shaft 90. As $\phi$ passes through 90° shaft 96 reverses direction, continuing the acceleration of the output shaft, which reaches its normal maximum speed at $\phi = 180°$ with machine 94 again operating at normal speed, but in the opposite direction.

The system of FIG. 4 is illustrative of those systems in which a rotary transformer is utilized not only to produce a conveniently variable secondary voltage $E_s$ from a constant input supply voltage $E_p$, but to deliver at the same time mechanical power from its rotor. In fact, that mechanical power may flow in either direction, so that machine 10 can be described as transducing power between electrical form at the brush set 40 and mechanical form at rotor shaft 23. That power transducing function can operate essentially independently of the DC-to-DC transformer function that has been described in connection with FIG. 2. As a consequence, the current in primary circuit 64 of FIG. 4 comprises two distinct components, the reflected current $I_r$, which is related to secondary current $I_s$ by equation (3), as already described, and a current component due to the mechanical load on rotor shaft 23, which is essentially proportional to the load torque exerted on that shaft and will be referred to as the torque current $I_t$. Thus, the total primary current $I_p$ is given by $$I_p = I_r + I_t$$

(8)

The armature reaction mmf due to both the reflected component $I_r$ of the primary current and the secondary current $I_s$ can be satisfactorily alleviated by means of over-excitation winding means carrying the secondary current as already described in connection with FIG. 2. Two distinct auxiliary windings may be used, typically connected as shown in FIG. 2. However, FIG. 4 illustrates use of a single winding 84a for that purpose, excited by the entire secondary current after rectification by bridge rectifier 86a.

However, there remains the armature reaction mmf due to the torque current component $I_t$ in the primary circuit. The problem of correcting the armature reaction due to such torque current in a rotary transformer does not in general permit a straightforward solution since the torque current component flows in the same circuit as the reflected current $I_r$, and is not accessible to be passed through a compensating winding or through an over-excitation winding.

In accordance with the present invention, it is possible, nevertheless, to correct satisfactorily the torque component of the armature reaction of a transformer-transducer machine under the special conditions of a differentially coupled system such as that illustrated in FIG. 4. Moreover, that correction for the torque current in the primary circuit is accomplished by means of an auxiliary winding or windings carrying the current that flows in the secondary circuit.

Illustrative auxiliary winding means for that purpose are shown schematically at 104 in FIG. 4, comprising the two windings 106 and 107, which are aligned on the axis 105 perpendicular to pole axis 15 and parallel to primary brush axis 41. Windings 106 and 107 may be considered as compensating windings which are incorporated in the main field structure of the machine, or as interpole windings associated with interpoles aligned with axis 105 and not explicitly shown in the figure. For clarity of description, such windings will be described in general simply as compensation windings. Compensating windings 106 and 107 are connected directly in series with the respective secondary brush sets 42 and 44, so that one half of the secondary current $I_s$ flows through each winding without rectification. With suitable selection of the number of turns in those windings, the resulting mmf provides accurate compensation for the armature reaction mmf actually produced by the component $I_t$ of the primary current.

That solution is made possible because differential gearing 92 has the property that a torque applied to output shaft 90 by output apparatus 102 exerts upon shafts 23 and 94 respective torques having a constant ratio. For a symmetrical differential, that ratio is unity. Under that preferred condition, assuming similar construction of the two dynamo-electric machines 10 and 94, and neglecting normal magnetic and similar losses, the armature current in machine 94 always equals the torque component of the armature current in transformer-transducer 10, regardless of the respective speeds and directions of rotation. And since the armature current of machine 94 is also the secondary current $I_s$ of the transformer, that secondary current equals the torque component $I_t$ of the primary current. Hence, correct armature reaction compensation is obtainable for the current component $I_t$ that actually flows in the primary circuit of machine 10 by designing windings 106 and 107 to provide the same total number of ampere turns that would be required in a conventional compensation winding if the machine were operating only as a motor with the entire current $I_s$ flowing between the brushes of brush set 40.

When full compensation of the armature reaction due to torque component $I_t$ of the primary current is not required, the subtractive effect of that reaction can be corrected by adding a suitable number of turns to over-excitation winding 84a, which has been described as correcting the armature reaction due to both the secondary current and the reflected component of the primary current. As has been explained, the maximum armature reaction due to the latter currents, and hence the ampere turns required in winding 84a, are only one fourth what they would be if counter-rotating secondary brushes were not used. On the other hand, there is no corresponding reduction in the maximum armature reaction due to torque component $I_t$, which flows in primary circuit 64. Hence, if the latter reaction is to be corrected by an over-excitation winding, four times as many ampere turns must typically be added as are otherwise present in winding 84a.

If differential gearing 92 is unsymmetrical, so that zero speed of output shaft 90 occurs when the speeds of shafts 23 and 96 have a ratio different from unity, the load torques exerted on those shafts have a ratio correspondingly different from unity. Under that condition and/or if machines 10 and 94 differ in design, the number of ampere turns in compensating windings 106 and 107, or in the corresponding over-excitation winding, is altered accordingly.

The armature reaction in machine 94 can be corrected by providing that machine with an over-excitation winding energized by the rectified secondary current $I_s$ from rectifier 86a. Alternatively, that reaction can be fully compensated by means of a single compensating winding having a suitable number of amphere turns and excited by the secondary current without rectification. As illustratively shown in FIG. 4, machine 94 has the compensating winding means 110, comprising the two windings 112 and 113 mounted on the axis 111 and connected in series with the respective secondary brush sets 42 and 44 of machine 10, so that each winding receives a current $I_s/2$. Each of those brush sets is connected in series with one of the windings of compensating winding means 104 of machine 10 and with one of the windings of compensating winding means 110 of machine 94. Those two series circuits are connected in parallel at the junction points 116 and 117, forming a loop circuit which includes the series impedance of all those windings, tending to reduce circulating currents in that loop. Thus, the splitting of each compensating winding means 104 and 110 into two windings is similar in function to the splitting of over-excitation winding means 82 in FIG. 2. However, when the additional loop impedance is provided in the form of compensation windings rather than over-excitation windings, the duplication of rectifying circuits is avoided. It will be understood that the value of the impedance inserted in any such loop circuit can be varied as desired by suitable selection of the auxiliary windings, or portions thereof, that are included in the circuit.

Illustrative Modifications

Bridge rectifiers 86 and 87 of FIG. 2 and rectifier 86a of FIG. 4 are illustrative of many known rectifying devices which may perform an equivalent function. For example, each of those bridge rectifiers may be replaced, if desired, by two parallel-connected single phase rectifiers which are connected in series with respective auxiliary windings. FIG. 5 illustrates such a rectifying circuit, comprising the diodes 86b and 86c and the two auxiliary winding sections 84b and 84c. Each of the latter windings typically contains the same number of turns as the single winding 84, 84a or 85 which they replace, and has such polarity that when armature current is allowed to flow through it by the series-connected diode its mmf adds to that of the separately excited main winding 17. Both configurations provide rectified over-excitation. The circuit of FIG. 5 inserts only one diode forward-voltage drop in series with the armature, but twice as many total ampere-turns are required for the two over-excitation windings, since only one is in use at a time.

FIG. 6 represents a further modification whereby rectified over-excitation is obtained without physically passing the secondary current through an auxiliary winding. Instead, the amplifying device 118 includes electronic circuit means of known form for sensing the value of the current flowing in secondary circuit 70 and for producing in output circuit 119 a field current $I_f$ satisfying the functional relation $$I_f = I_o + K|I_s| \qquad (9)$$

That current is supplied to the main field winding 17a so that the total field ampere-turns consist of a constant component due to $I_o$ and an additive component proportional to the magnitude of the secondary current $I_s$ and independent of the direction of $I_s$. The value of $I_o$ is selected to produce substantial saturation of the field structure, while the constant of proportionality $K$ is selected to provide the additional mmf required to produce the desired degree of over-excitation. When the secondary circuit includes counter-rotating brush sets, such as 42 and 44, the additional mmf, and therefore the value of $K$, are each only one fourth what would otherwise be required.

Dual Output Systems

When a rotary transformer is employed for controlling the secondary voltage supplied to a single electrical output load, the potential advantages of the present invention are most effectively obtained by connecting the two sets of counter-rotating brushes in parallel, thereby insuring that the secondary current supplied to the load is equally shared between them. The output terminal means then comprise typically a single set of terminals to which the two secondary brush sets are connected in parallel, either directly or with an auxiliary winding or the like in series with each brush set. Such a set of output terminals may, of course, be connected in parallel to a plurality of distinct loads all of which are to receive equal secondary voltages.

In accordance with a further aspect of the invention, it may also be advantageous to provide counter-rotating brushes in a transformer employed for controlling two electrical loads which do not always require equal voltages. That is especially true, for example, if the two required secondary voltages normally vary in like manner, and depart from equality only occasionally or only to a moderate degree. Typical of such systems are those in which the two electrical loads comprise direct current shunt motors which produce drive actions that normally operate at similar speeds, but must be differentially variable to maintain a required correlation with each other.

Illustrative drive systems of that type include, for example, cable reeling systems in which two cables are normally driven at variable but substantially equal speeds by the respective motors, with a requirement for differential adjustment of the speeds to maintain a desired relationship between the cables. A further example is a vehicle drive system in which right and left vehicle wheels are driven by the respective motors. The vehicle speed is then controlled by like variations of the motor speeds, and the vehicle is steered by differential variations of the motor speeds. For controlling such dual loads the secondary brush sets of the rotary transformer are preferably adjustably driven by mechanism capable of producing two distinct modes of control, a counter-rotation mode which moves the two brush sets through equal and opposite angles with respect to the primary brush set, in the manner already described, and an equal-rotation mode which moves the two brush sets through equal angles in the same direction. The two loads are connected to the respective brush sets of the rotary transformer in such polarity that the counter-rotation mode of brush adjustment produces like variation of the secondary voltages, while equal movement of the brush sets produces differential variation for the voltages. The output terminal means then typically comprise a set of terminals for each of the secondary brush sets.

FIGS. 7 and 8 are illustrative of systems of the described type. Brush sets 42 and 44 are connected via the output terminal means 71a and 72a in series with the respective direct current shunt motors 120 and 124. The field windings 122 and 126 of the respective motors are separately excited, as from voltage source 60. Auxiliary field windings for correction of armature reaction may be provided on any or all of the three machines of FIG. 7, typically connected in series with the respective armature circuits, but are omitted in the drawing for clarity of illustration. The two motor shafts 123 and 127 may be coupled to any desired output devices, or to a single output device requiring two related but distinct power connections.

Illustrative control mechanism for producing the described two modes of brush movement from a remote location is indicated schematically at 130 in FIG. 7, with the manual handle 140 and coupling 150 to the brush sets 42 and 44. As typically shown in FIG. 8, control mechanism 130 comprises a differential gear structure in which the two sun gears 132 and 134 are coaxially journaled on the fixed axis 131 and are oppositely engaged by the planet gear 136. Planet gear 136 is journaled on the stirrup 138, which is freely rotatable about axis 131, carrying the radial planet gear axis 137 with it. The control handle 140 is fixedly mounted on the planet gear shaft. Handle 140 thus has two degrees of freedom, namely, rotation about the planet gear axis or handle axis 137, as indicated by the arrow 142, producing rotation of the two sun gears through equal angles in opposite directions; and swinging movement about the sun gear axis or swing axis 131, as indicated by the arrow 144, producing corresponding rotation of the two sun gears in like direction. The two sun gears of mechanism 130 are coupled by any suitable means, mechanical, electrical, hydraulic or the like, to the respective mounting rings which carry the secondary brush sets. The two degrees of freedom of handle 140, indicated by arrows 142 and 144, then control the two described modes of movement of the brush sets.

As shown illustratively in FIG. 8, coupling mechanism 150 comprises the two flexible shafts 153 and 155, which are coupled at one end via the bevel pinions 152 and 154 to the respective sun gears 132 and 134, and at the other end via the bevel pinions 156 and 158 to the respective rings 32 and 34, all four pinions being journaled on fixed axes. That coupling structure embodies a form of anti-symmetry between the two drive connections. That feature is particularly desirable for controlling systems of the type described, in which the two motors 120 and 124 of FIG. 7 produce respective drive actions that normally operate at similar speeds, but must be differentially variable to maintain a required correlation with each other. In such systems it is convenient for an operator to make required common adjustments of the two speeds by forward and back swinging movement of handle 140, and to make differential speed adjustments by rotation of handle 140 to right or left.

That correlation between the handle movements and the drive control functions is provided by the anti-symmetrical coupling feature of coupling mechanism 150. In that mechanism, which is illustrative of the wide variety of mechanisms for performing an equivalent function, pinion 154 is so mounted that it engages bevel gear teeth on the outer face of sun gear 134, whereas pinion 152 engages teeth on the inner face of sun gear 132. As a result of that anti-symmetry, rotary handle movement 142, though producing counter-rotation of gears 132 and 134, causes like rotation of the two brush sets; and swinging movement 144 of the handle, though driving gears 132 and 134 in the same direction, produces counter-rotation of the brush sets. That inverse correspondence between the illustrated degrees of freedom of handle 140 and the two modes of brush movement produces the desired correlation between handle movements and control functions.

I claim:

1. Dynamo-electric apparatus for transforming direct current electric power between a constant supply voltage and a controllably variable output voltage, said apparatus including a rotor journaled on a rotor axis and having electrically coupled commutator means and armature winding means, substantially magnetically saturated field structure cooperating electromagnetically with the armature winding means, supply terminal means for connection to a source of direct current supply voltage, output terminal means for connection to external means for utilizing the direct current output voltage, and a set of primary brushes engaging the commutator means at electrically neutral angular position and electrically connected to the supply terminal means for producing rotor rotation, said apparatus further comprising two sets of secondary brushes engaging the commutator means and mounted for rotary movement about the axis, control means for adjustably rotating the secondary brush sets through equal angles and in opposite directions with respect to the position of the primary brush set, and circuit means connecting the secondary brush sets to the output terminal means for producing at said terminal means direct current voltages responsive to said control means and for normally supplying to said terminal means substantially equal secondary direct currents from the respective brush sets.

2. Dynamo-electric apparatus according to claim 1 in which said two secondary brush sets are rotatable continuously between positions aligned with said primary brush set and positions spaced 180 electrical degrees therefrom.

3. Dynamo-electric apparatus according to claim 1 including means for mechanically coupling said rotor to an external device for utilizing mechanical power derived from the rotor.

4. Dynamo-electric apparatus according to claim 1 in which said field structure comprises main magnetic pole structure and field winding means magnetically coupled thereto, and field circuit means for producing in the field winding means first and second direct current components which are magnetically additive, the value of the first component being constant and selected to substantially saturate the magnetic pole structure, and the value of the second component being variable, said field circuit means including means for maintaining said second component substantially proportional to the sum of the absolute magnitudes of the currents flowing in the secondary brush sets with a factor of proportionality selected to compensate only the parallel components of the total armature reaction mmf due to said currents.

5. Dynamo-electric apparatus according to claim 4 in which said field circuit means comprise diode rectifying circuit means connected in series with the secondary brush sets and connected to said field winding means for producing said second current component.

6. Dynamo-electric apparatus according to claim 1 in which said field structure comprises main magnetic pole structure and main and auxiliary field winding means magnetically coupled thereto, main field circuit means for energizing the main field winding means, and auxiliary field circuit means for connecting each of said secondary brush sets in series relation with the auxiliary field winding means.

7. Dynamo-electric apparatus according to claim 6 in which said auxiliary field circuit means include rectifying circuit means for so directing current in the auxiliary field winding means that the main and auxiliary winding means are magnetically additive independently of the current direction in the secondary brush sets.

8. Dynamo-electric apparatus according to claim 6 in which said auxiliary field winding means comprise at least two distinct auxiliary field windings, and said auxiliary field circuit means comprise means for connecting said windings in series with the respective secondary brush sets.

9. Dynamo-electric apparatus according to claim 8 in which said auxiliary field circuit means include rectifying circuit means for each said auxiliary field winding for so directing current therein that the main and auxiliary winding means are magnetically additive independently of the current direction in the secondary brush sets.

10. Dynamo-electric apparatus according to claim 1 including also a dynamo-electric machine having a rotor and having an input brush set electrically connected via said output terminal means to said secondary brush sets in parallel to form a secondary circuit, said machine having separately excited field structure, and an output shaft differentially coupled to the respective rotors of said dynamo-electric apparatus and of said dynamo-electric machine.

11. Dynamo-electric apparatus according to claim 10 in which said field structure of said dynamo-electric apparatus includes compensation winding means, and means for supplying to the compensation winding means a current proportional to the current flowing in said secondary circuit to compensate the armature reaction due to the current component in the primary brush set resulting from rotor torque.

12. Dynamo-electric apparatus according to claim 10 in which said field structure of said dynamo-electric apparatus includes auxiliary field winding means comprising over-excitation winding means and compensation winding means, means for supplying to the over-excitation winding means a current having a constant direction and corresponding in magnitude to the current flowing in said secondary circuit, and means for supplying to the compensation winding means a current corresponding in magnitude and direction to the current flowing in said secondary circuit.

13. Dynamo-electric apparatus according to claim 10 and in which said field structure of said dynamo-electric apparatus includes over-excitation winding means, and means for supplying to the over-excitation winding means a current having a constant direction and having a magnitude corresponding to the current flowing in said secondary circuit and of such value as to correct the maximum armature reaction due to all currents flowing in said armature means.

14. Dynamo-electric apparatus according to claim 1 including also two similar voltage utilization devices electrically connected via said output terminal means to the respective said secondary brush sets, said control means including a manual control handle coupled to said secondary brush sets and movable in one coordinate for adjustably rotating the secondary brush sets through equal angles in opposite directions to produce like variations of the voltages applied to the respective devices, and movable in another coordinate for rotating the secondary brush sets in the same direction to vary differentially the voltages applied to the respective devices.

15. Dynamo-electric apparatus according to claim 14 in which
said other coordinate of handle movement comprises rotation about a handle axis on which a planet gear is journaled, and said one coordinate of handle movement comprises swinging of the handle and handle axis about a swing axis which is perpendicular to the handle axis and on which are journaled two sun gears coupled to the respective secondary brush sets.

16. Dynamo-electric apparatus according to claim 14 in which said voltage utilization devices are separately excited direct current motors coupled to respective mechanical loads which are driven at speeds that are normally similar and are subject to differential variation.

17. Dynamo-electric apparatus according to claim 1 in which said output terminal means comprise two output terminals and said circuit means connect said secondary brush sets in parallel between the output terminals.

* * * * *